Patented Jan. 23, 1934

1,944,630

UNITED STATES PATENT OFFICE 1,944,630

PROCESS FOR PURIFICATION OF CAUSTIC SODA SOLUTION

Harry Bender, Antioch, Calif., assignor, by mesne assignments, to Pennsylvania Salt Manufacturing Company, Philadelphia, Pa., a corporation of Pennsylvania No Drawing. Application September 26, 1929
Serial No. 395,463

1 Claim. (Cl. 23—50)

This invention relates to the manufacture of caustic soda, particularly from solutions thereof obtained by electrolysis of salt brine in diaphragm cells.

The object of the invention is to provide a process of removing from the solution most of the dissolved sodium chloride so that the sodium hydroxide finally obtained is in a high state of purity.

The caustic liquor from electrolytic diaphragm cells usually contains from 10 to 14% NaOH and from 15 to 12% NaCl, besides smaller quantities of sodium sulphate. The separation of the caustic soda from chloride is usually effected by evaporation of the caustic liquor to approximately 50% NaOH, whereby the bulk of the chloride is precipitated, and removed in any desired manner. This evaporation of the caustic solution to the concentration mentioned, is ordinarily carried out in vacuum evaporators. For the production of solid caustic soda the approximately 50% liquor is transferred to cast iron pots where the remaining water is driven off by direct fire until a molten solid finally remains. Naturally all of the salts contained in the 50% liquor will appear in the final solid and it is therefore barely possible to reach a purity of 97 to 98% NaOH by this procedure. By means of the present invention I am able to effect a further removal of the sodium chloride from the evaporated liquor, prior to the conversion into solid caustic, so that the conversion will yield a product containing 99 to 99.6 NaOH. This I accomplish by the addition of sodium sulphate, either anhydrous or hydrated or even in solution, to the evaporated caustic soda liquor with thorough mixing, which will produce a hitherto unknown compound, a double salt of the composition $NaOH \cdot NaCl \cdot Na_2SO_4$. I have found this double salt to exist in caustic soda solutions of a concentration from 38% NaOH to 60% NaOH and at temperatures from 20° C. to somewhere near the boiling point of the solution.

The reaction to form the double salt is more rapid at higher temperatures but it may of course be effected at any temperature from 20° C. to the boiling point of solution only as is shown later that the amount carried in solution is somewhat higher at the higher temperature. I may make use of this by forming the double salt at the higher temperature and allowing to cool for more complete removal, although I do not limit myself to this procedure.

This double salt crystallizes out of the solution in long needles which are distinctly different from those of sodium sulphate and of course differ greatly from sodium chloride crystals. The compound salt is removed from the solution of caustic by filtration or decantation.

Caustic soda solutions which are in equilibrium with this new compound contain a much smaller amount of sodium chloride than those in equilibrium with sodium chloride only. An illustration of the influence of the addition of sodium sulphate and the subsequent formation of the double salt is given on attached two tables, #1 and #2.

It will be noted on Table #1 that at 20° C. a solution containing 47% NaOH still retains .98% NaCl. The conversion of this solution into solid caustic soda will only yield a purity under the most favorable conditions of 98%, actually it will be less than this because of the inevitable formation of some sodium carbonate during solidification.

On Table #2, showing equilibrium conditions of the double salt it will be noted that a caustic soda solution containing 47% NaOH contains .1% NaCl and .28% $Na_2SO_4$. A solid caustic produced from this solution will have a purity of 99.4% NaOH and such a product will satisfy all demands on caustic soda regarding purity. The quantity of sodium sulphate necessary for removal of the contained sodium chloride is the theoretical quantity contained in the double salt, that is 142 parts of $Na_2SO_4$ for 58.5 parts of NaCl or 2.43 parts $Na_2SO_4$ for each part dissolved sodium chloride in the liquor. This quantity of sodium sulphate constitutes a minimum with which a complete removal can be accomplished. If a larger quantity of sodium sulphate is added, the excess will be precipitated together with the double salt. The lowest concentration at which the double salt is formed is at about 38% NaOH.

While the main application of this invention is the purification of caustic solutions prior to their conversion into solid caustic, I do not limit myself to this practice, as my process may be applied to any caustic solution containing sodium chloride and to be used for any purpose.

1

*Solubility of NaCl in NaOH solution*

|  | Solid phase: NaCl | | |
|---|---|---|---|
| 20° C.<br>NaOH<br>NaCl | 38.00%<br>1.99% | 41.50%<br>1.35% | 47.00%<br>.98% |
| 40° C.<br>NaOH<br>NaCl | 41.00%<br>1.80% | 43.00%<br>1.62% | 47.50%<br>1.30% |
| 80° C.<br>NaOH<br>NaCl | 38.50%<br>3.80% | 44.50%<br>2.88% | 47.50%<br>2.51% |

2
*Solubility of NaCl and Na₂SO₄ in NaOH solution*

| | Solid phases: $NaOH \cdot NaCl \cdot Na_2SO_4$ | | $Na_2SO_4$ |
|---|---|---|---|
| 20° C. | | | |
| NaOH | 38.10% | 41.78% | 47.00% |
| NaCl | 1.01% | .47% | .10% |
| Na₂SO₄ | .25% | .26% | .28% |
| 40° C. | | | |
| NaOH | 40.95% | 43.17% | 47.33% |
| NaCl | .56% | .51% | .19% |
| Na₂SO₄ | .28% | .33% | .28% |
| 80° C. | | | |
| NaOH | 38.20% | 44.52% | 47.66% |
| NaCl | 1.93% | .66% | .59% |
| Na₂SO₄ | .57% | .51% | .38% |

As stated, I preferably use the anhydrous sodium sulphate, and in substantially the proportions given in the specification, though I may use acid sulphate or introduce sulphuric acid in quantity to form the amount of sulphate required for further reactance to form the compound salt, and therefore I claim:

A new composition of matter comprising a chemical salt having the formula:

$$NaOH \cdot NACl \cdot Na_2SO_4.$$

HARRY BENDER.